(12) United States Patent
Tijink et al.

(10) Patent No.: US 11,506,798 B2
(45) Date of Patent: Nov. 22, 2022

(54) ITS STATION FOR A VULNERABLE ROAD USER

(71) Applicant: Kapsch TrafficCom AG, Vienna (AT)

(72) Inventors: Jasja Tijink, Breitenfurt (AT); Dieter Smely, Schwechat (AT)

(73) Assignee: Kapsch TrafficCom AG, Vienna (AT)

( * ) Notice: Subject to any disclaimer, the term of this patent is extended or adjusted under 35 U.S.C. 154(b) by 199 days.

(21) Appl. No.: 16/990,555

(22) Filed: Aug. 11, 2020

(65) Prior Publication Data

US 2021/0055428 A1    Feb. 25, 2021

(30) Foreign Application Priority Data

Aug. 22, 2019   (EP) .................................. 19192998

(51) Int. Cl.
| | |
|---|---|
| *G01S 19/51* | (2010.01) |
| *G01S 19/39* | (2010.01) |
| *G01S 19/52* | (2010.01) |
| *G08G 1/16* | (2006.01) |

(52) U.S. Cl.
CPC ............ *G01S 19/51* (2013.01); *G01S 19/393* (2019.08); *G01S 19/52* (2013.01); *G08G 1/166* (2013.01)

(58) Field of Classification Search
CPC ......... G01S 19/51; G01S 19/393; G01S 19/52
USPC .................... 342/357.34, 450, 417, 377, 424
See application file for complete search history.

(56) References Cited

U.S. PATENT DOCUMENTS

| | | |
|---|---|---|
| 2013/0210460 A1 | 8/2013 | Subramanian et al. |
| 2018/0262865 A1 | 9/2018 | Lepp et al. |
| 2019/0053154 A1* | 2/2019 | Song ........................ H04W 4/90 |

OTHER PUBLICATIONS

Extended European Search Report received for European Patent Application No. 19192998.3, dated Jan. 2, 2020, 9 pages.

* cited by examiner

*Primary Examiner* — Bo Fan
(74) *Attorney, Agent, or Firm* — Fiala & Weaver P.L.L.C.

(57) ABSTRACT

The disclosed subject matter relates to an Intelligent Transportation System station (ITS-S) for being carried by a Vulnerable Road User (VRU), comprising: a motion sensor for determining VRU motion data indicative of a VRU position, a VRU speed, and a VRU heading; a transmitter for transmitting a VRU message including the determined VRU motion data; a receiver for receiving, concerning a vehicle, vehicle motion data indicative of a vehicle position, a vehicle speed, and a vehicle heading; and a controller for controlling the transmitter; wherein the controller is configured to compare the determined VRU motion data with the received vehicle motion data and, when the result of the comparison meets a predetermined criterion, to suppress the transmitting of said VRU message.

11 Claims, 2 Drawing Sheets

ITS STATION FOR A VULNERABLE ROAD USER

CROSS-REFERENCE TO RELATED APPLICATIONS

Figure 1:
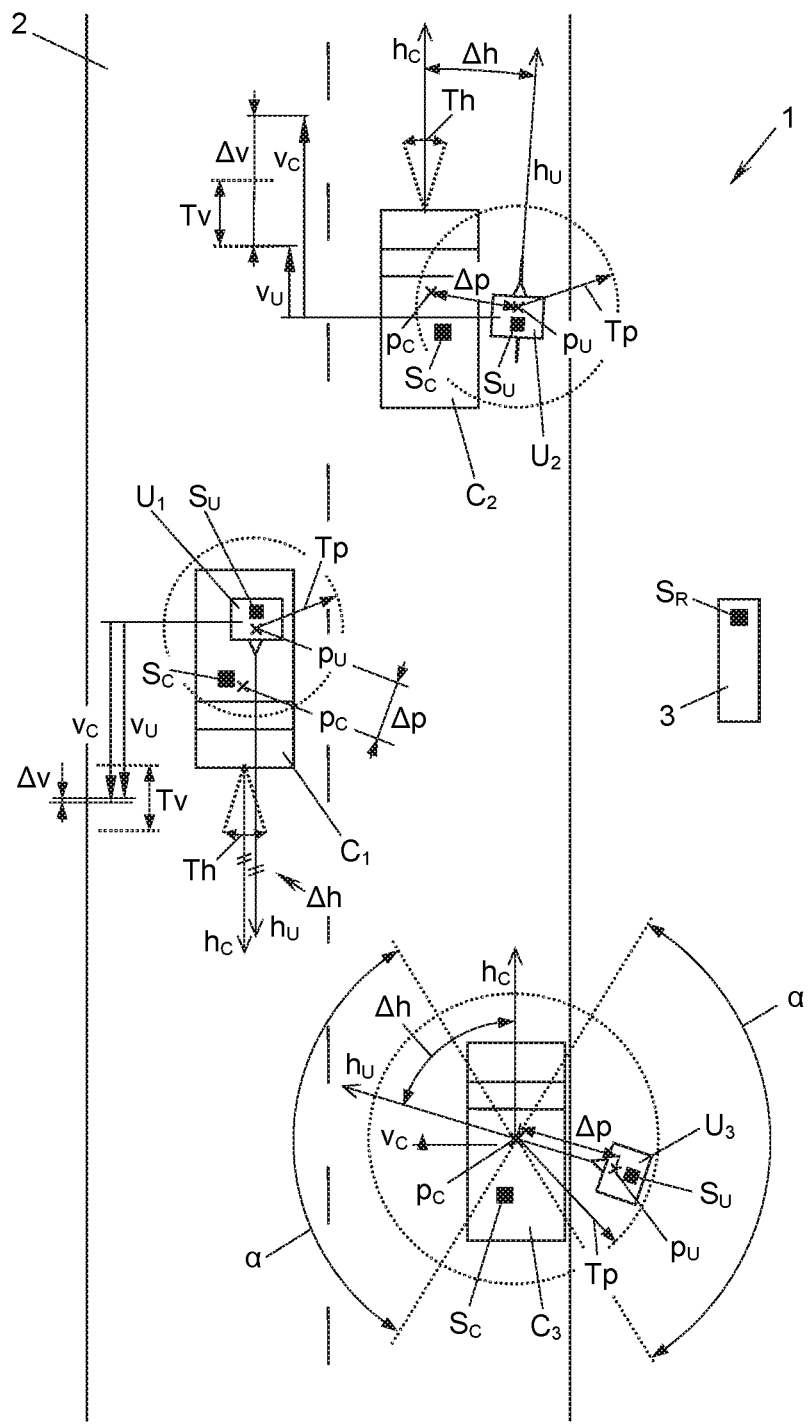

This application claims priority to European Patent Application No. 19 192 998.3, filed on Aug. 22, 2019, the entirety of which is incorporated herein by reference.

BACKGROUND

Technical Field

The disclosed subject matter relates to an Intelligent Transportation System station (ITS-S), particularly to an ITS-S for being carried by a Vulnerable Road User (VRU).

Background Art

For keeping traffic moving and for increasing road safety, a growing number of vehicles is equipped with an onboard ITS-S. It is even envisaged, e.g., in the SAE International Standard SAE J2945/9, that a VRU, i.e., a road user that is particularly vulnerable to injury, such as a pedestrian, a cyclist, a powered two wheeler (PTW) or an animal, carries an ITS-S which repetitively transmits VRU-specific messages, e.g., Personal Safety Messages (PSMs). Each VRU message comprises, inter alia, the VRU's current position, speed and heading, which shall be considered by other ITS-S.

The basic Intelligent Transportation System (ITS) communication architecture is described in ETSI (European Telecommunications Standards Institute) Standard ETSI EN 302 665 and related standards. According thereto, each ITS-S repetitively transmits messages comprising motion data determined by vehicle and/or ITS-S sensors to other ITS-S within its radio coverage to inform each other ITS-S. Moreover, each ITS-S receives messages repetitively sent by other ITS-S comprising their respective motion data. In a vehicle-to-vehicle (V2V) communication, each ITS-S is in or aboard a vehicle; in vehicle-to-infrastructure (V2I) communication, a vehicle ITS-S communicates with an ITS-S of a roadside unit (RSU); in vehicle-to-centre (V2C) communication, a vehicle ITS-S communicates with a central server of the ITS using, e.g., a communication tunnel via other vehicles and/or RSUs. The messages are, e.g., Cooperative Awareness Messages (CAM) according to ETSI EN 302 637-2, comprising motion data like position, speed and heading of the vehicle transmitting the message. In some cases the messages are Basic Safety Messages (BSM) according to the SAE International Standard J2735 BSM, which comprise additional (sensor) data, e.g., vehicle size, acceleration, brake state etc. In other cases, the messages are Collective Perception Messages (CPM) according to the ETSI Technical Specification TS 103 324, which are used to also share "perceptions" (detections, analysis, trackings) between vehicles and infrastructure; an example for a perception is an object on the road, e.g., a VRU, which is perceived by the sensors of a communicating vehicle, e.g., by a radar sensor and/or a vehicle camera.

For sharing information, each ITS-S sends such messages typically in the range of one to ten times per second, depending on the message type, content and/or environment etc. For example, a PSM according to SAE J2945/9 is transmitted two to five times per second, depending on the speed of the VRU. With the increase in number of ITS-S also the risk of a radio channel congestion increases. Moreover, while power supply of a vehicle or RSU ITS-S is easily possible, the battery of an ITS-S which is to be carried by a VRU is very limited in size and weight.

BRIEF SUMMARY

It is an object of the disclosed subject matter to provide an ITS-S for a VRU that is lightweight and energy efficient and still achieves the desired safety requirements.

This object is achieved by an ITS-S for being carried by a Vulnerable Road User (VRU), comprising a motion sensor configured to determine VRU motion data indicative of a VRU position, a VRU speed, and a VRU heading, a transmitter connected to the motion sensor and configured to transmit a VRU message including the determined VRU motion data, a receiver configured to receive, concerning a vehicle, vehicle motion data indicative of a vehicle position, a vehicle speed, and a vehicle heading, and a controller connected to the motion sensor and to the receiver and configured to control the transmitter, wherein the controller is configured to compare the determined VRU motion data with the received vehicle motion data and, when the result of the comparison meets a predetermined criterion, to suppress the transmitting of said VRU message.

Thereby, the ITS-S is capable of detecting, on the basis of the comparison of the VRU's and the vehicle's motion data, a possible relation between the motion of the VRU and the vehicle, e.g., that the VRU is aboard a vehicle. In this case, the VRU is no longer considered vulnerable and the transmitting of VRU messages becomes unnecessary and, when the vehicle has its own ITS-S, even redundant. Otherwise, when the VRU is not detected to be aboard a vehicle, VRU messages are transmitted as required for reasons of safety of the VRU. As the transmitter generally consumes a major part of the energy stored in the ITS-S's battery the suppression of the transmitting of the VRU messages substantially contributes to the lifetime of the battery and, consequently, to the efficiency and the saving of weight of the ITS-S.

It is understood that usually the motion sensor determines the VRU motion data repetitively and that the receiver receives vehicle motion data repetitively and/or concerning different vehicles either from the respective vehicles, from one or more other vehicles, from an RSU or from a central server of the ITS, such that the comparison is also performed repetitively by the controller.

Different types of comparisons may advantageously be performed by the controller. In one embodiment, said comparison comprises the determination of a position difference between the VRU position and the vehicle position, of a speed difference between the VRU speed and the vehicle speed, and of a heading difference between the VRU heading and the vehicle heading, wherein said predetermined criterion is met when each of the position, the speed, and the heading differences falls below a respective predetermined threshold. The criterion of a position difference falling below the position threshold, a speed difference falling below the speed threshold, and a heading difference falling below the heading threshold is equivalent to comparing movement vectors of the vehicle and the VRU whereat, when they are found to be (sufficiently) similar, i.e., when said differences all fall below the respective thresholds, it can reasonably be assumed that the VRU is aboard the vehicle.

In an additional or alternative embodiment, said comparison comprises the determination of a position difference between the VRU position and the vehicle position and of a heading difference between the VRU heading and the vehicle heading, and said predetermined criterion is met when the position difference falls below a predetermined position threshold, the heading difference falls within a predetermined range, and the vehicle speed is substantially zero. In this embodiment, a boarding of the vehicle by the VRU is detected based on a standstill, e.g., parking, of the vehicle and the VRU approaching and/or boarding the vehicle from a predetermined direction, e.g., from a lateral side. Therefor, it is particularly beneficial when said predetermined range is from 30 degrees to 150 degrees and/or from 210 degrees to 330 degrees.

In a favourable embodiment, the motion sensor comprises a Global Navigation Satellite System (GNSS) based position sensor repetitively generating VRU position fixes and is configured to determine the VRU speed and VRU heading based on two or more of the generated VRU position fixes. A separate sensor for heading, speed and/or acceleration can thereby be saved.

While the VRU message may be a CAM according to ETSI EN 302 637-2, it is advantageous, when the VRU message is a PSM according to SAE J2945/9 or a related standard. This standard is particularly suitable for light weight, low energy VRUs.

It shall be noted that the vehicle motion data received in the receiver is not necessarily bound to messages of a certain standard. Moreover, as the received motion data is only indicative of the vehicle position, speed and heading, it does not necessarily comprise all this information directly. Hence, in a particularly universally applicable embodiment, the received vehicle motion data comprises vehicle position fixes, and the VRU controller is configured to determine the vehicle speed and vehicle heading based on two or more of the received vehicle position fixes. In this embodiment, the ITS-S of the VRU receives messages from vehicles that are not necessarily part of a standardised ITS. The ITS-S can be used even though the vehicle motion data is very much condensed in this case. However, in a general embodiment the received vehicle motion data is advantageously included in a Basic Safety Message, BSM, a Cooperative Awareness Message, CAM, or a Collective Perception Message, CPM. Thereby, the ITS-S is usable in an ITS according to a current standard.

BRIEF DESCRIPTION OF THE DRAWINGS/FIGURES

Figure 2:
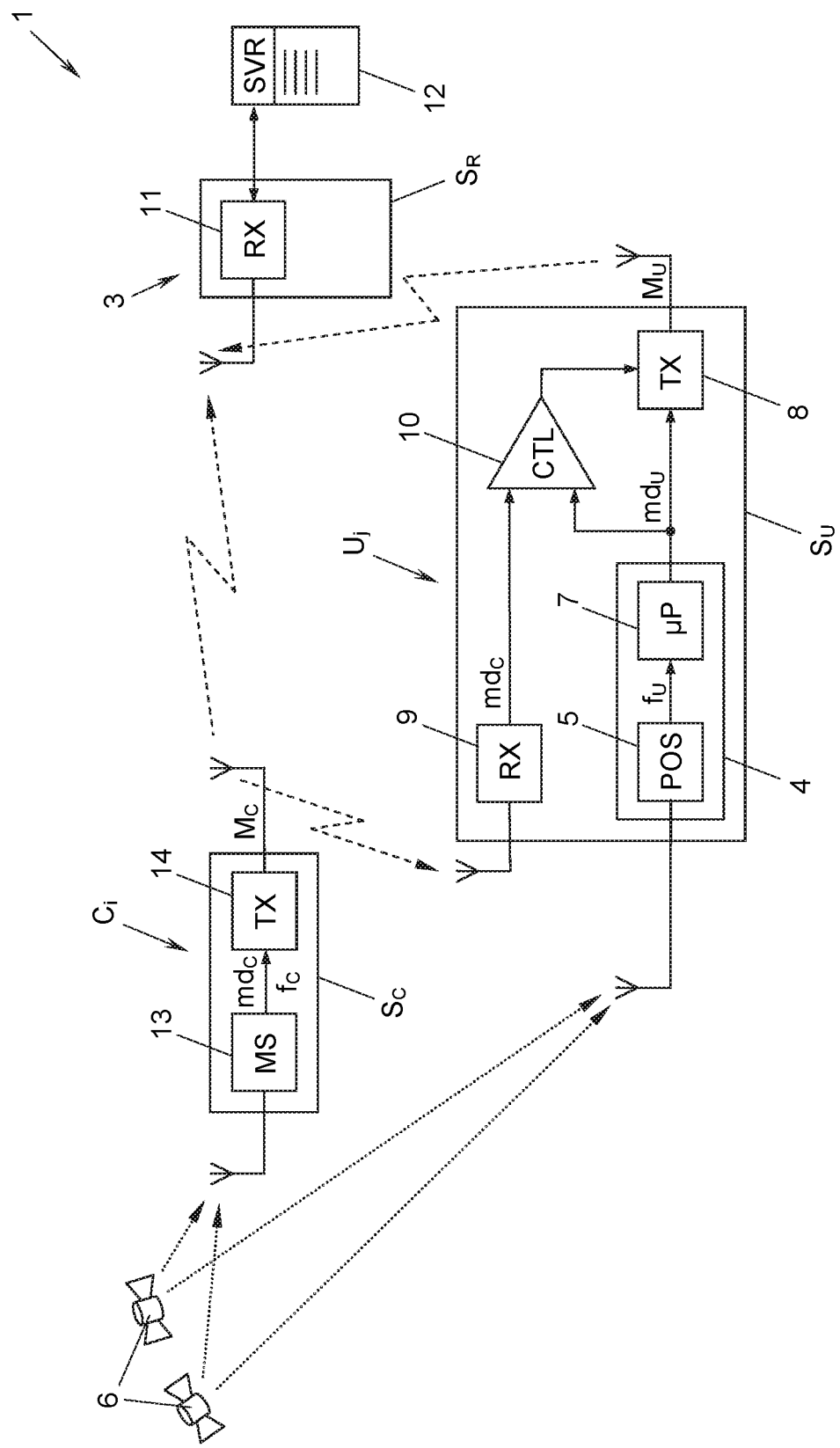

The disclosed subject matter will now be described in further detail by means of exemplary embodiments thereof under reference to the enclosed drawings, in which:

FIG. 1 shows Intelligent Transportation System stations according to the disclosed subject matter on a road with other road users in a plan view; and FIG. 2 shows an Intelligent Transportation System with an Intelligent Transportation System station according to the disclosed subject matter in a schematic block diagram.

DETAILED DESCRIPTION

The example of FIG. 1 shows a part of an Intelligent Transportation System (ITS) 1, in which several (here: three) vehicles $C_1$, $C_2$, . . . , generally $C_i$, are located on a road 2, each at a respective vehicle position $p_C$. Two of the vehicles $C_1$, $C_2$ are driving on the road 2, whereas a third vehicle $C_3$ in this example is parking. Each vehicle $C_1$ has its respective vehicle heading $h_C$ and vehicle speed $v_C$, the speed $v_C$ of the third vehicle $C_3$ being zero.

Similarly, there are Vulnerable Road Users (VRU) $U_1$, $U_2$, . . . , generally $U_j$, e.g., a cyclist $U_2$, a pedestrian $U_3$, a powered two wheeler (PTW) and/or an animal (not shown), on or alongside the road 2, each at a respective VRU position $p_U$ having a respective VRU heading $h_U$ and a respective VRU speed $v_U$ greater than or equal to zero. The VRU $U_1$ in the example of FIG. 1 is a passenger or driver aboard the vehicle $C_1$ driving on the road 2.

Next to the road 2, there is a Road Side Unit (RSU) 3 of the ITS 1. For communication in the ITS 1, the RSU 3 comprises an ITS station (ITS-S) $S_R$. Each vehicle $C_i$ optionally has a vehicle ITS-S $S_C$ of the ITS 1. Moreover, also the VRUs each carry a respective VRU ITS-S $S_U$ which optionally is integrated in a personal digital assistant, e.g., a smartphone, and shall now be described in greater detail with respect to FIG. 2.

According to FIG. 2, the ITS-S $S_U$ of each VRU $U_j$ includes a motion sensor 4 which is configured to determine VRU motion data $md_U$. The motion data $md_U$ is indicative of the VRU position $p_U$, the VRU speed $v_U$, and the VRU heading $h_U$ (FIG. 1). To this end, the motion sensor 4 optionally has a position sensor 5 which repetitively generates position fixes $f_U$ by locating itself with the help of satellites 6 of a Global Navigation Satellite System (GNSS), e.g., GPS, Galileo, Glonass etc.; other ways of determining the VRU position $p_U$ are known in the art, e.g., by means of triangulation in a cellular network etc., and may be applied. In some cases, the position sensor 5 directly generates the VRU speed $v_U$ and the VRU heading $h_U$; in other cases, however, the motion sensor 4 determines the VRU speed $v_U$ and the VRU heading $h_U$ on the basis of two or more of the generated VRU position fixes $f_U$, e.g., by means of a processor 7.

The VRU ITS-S $S_U$ further comprises a transmitter 8, a receiver 9 and a controller 10. The transmitter 8 is connected to the motion sensor 4 and is configured to transmit a VRU message $M_U$ to a receiver 11 of the RSU 3 which is connected to a central server 12 of the ITS 1. The VRU message $M_U$ is, e.g., a Personal Safety Message (PSM) according to the SAE International Standard SAE J 2945/9 or a related standard, or a Cooperative Awareness Message (CAM) according to ETSI (European Telecommunications Standards Institute) Standard ETSI EN 302 637-2 or a related standard. The VRU message $M_U$ includes the VRU motion data $md_U$ determined by the motion sensor 4.

As shown in the example of FIG. 2, each vehicle $C_i$ has a motion sensor 13 for determining vehicle motion data $md_C$, and a transmitter 14 for transmitting a message $M_C$ which comprises the determined motion data $md_C$, e.g., to the RSU 3 and the VRU ITS-S $S_U$. The vehicle message $M_C$ may be any type of message which the receiver 9 of the ITS-S $S_U$ of the VRU $U_j$ is able to receive. Similarly, the motion sensor 13 and the transmitter 14 of the vehicle $C_i$ may be of any type. In the example of FIG. 1, the vehicle $C_i$ has its ITS-S $S_C$, such that the motion sensor 13 determining the motion data $md_C$ and the transmitter 14 transmitting the message $M_C$ are optionally those of the vehicle ITS-S $S_C$.

The receiver 9 may optionally receive the motion data $md_C$ concerning a vehicle $C_i$ from another vehicle $C_{i+1}$, from an RSU 3, or from the central server 12 in the ITS 1, particularly, when the vehicle motion data $md_C$ of a vehicle $C_i$ was perceived by the other vehicle $C_{i+1}$ or by the RSU 3, which may optionally be the case. Moreover, the vehicle motion data $md_C$ may, e.g., be included in a Basic Safety Message (BSM) according to SAE J2735 BSM, a Cooperative Awareness Message (CAM) according to ETSI EN 302

637-2, and/or a Collective Perception Message (CPM) according to ETSI TS 103 324.

The receiver 9 of the VRU ITS-S $S_U$ is configured to receive the vehicle motion data $md_C$ transmitted in the message $M_C$ of the vehicle $C_i$. The vehicle motion data $md_C$ is indicative of the vehicle position $p_C$, the vehicle speed $v_C$ and the vehicle heading $h_C$ of the vehicle $C_i$. In one embodiment, the vehicle motion data $md_C$ directly comprises the vehicle position, speed and heading $p_C$, $v_C$, $h_C$. In another embodiment, the vehicle motion data $md_C$ comprises vehicle position fixes $f_C$ determined by the vehicle motion sensor 13, e.g., by means of the satellites 6 of the GNSS. In this case, the controller 10 of the VRU $U_j$ optionally determines the vehicle speed $v_C$ and the vehicle heading $h_C$ on the basis of two or more of the vehicle position fixes $f_C$ received from the transmitter 14 of the vehicle $C_i$. In this way, the vehicle position fixes $f_C$ comprised in the vehicle motion data $md_C$ are indicative of not only the vehicle position $p_C$, but also of the vehicle speed and heading $v_C$, $h_C$.

The controller 10 of the VRU $U_j$ is connected to the motion sensor 4 and to the receiver 9 and controls the transmitter 8. The controller 10 is configured to compare the VRU motion data $md_U$ determined by the motion sensor 4 with the vehicle motion data $md_C$ received by the receiver 9. When the result of this comparison meets at least one predetermined criterion, the controller 10 suppresses the transmitting of said VRU message $M_U$, otherwise it lets the transmitter 8 transmit the VRU message $M_U$.

With reference to FIG. 1, examples for said predetermined criterion shall now be explained in detail.

For meeting a first predetermined criterion, said comparison performed by the controller 10 comprises the determination of a position difference $\Delta p$ between the VRU position $p_U$ and the vehicle position $p_C$, of a speed difference $\Delta v$ between the VRU speed $v_U$ and the vehicle speed $v_C$, and of a heading difference $\Delta h$ between the VRU heading $h_U$ and the vehicle heading $h_C$.

In the example of the vehicle $C_1$ which has a passenger VRU $U_1$, the respective position, speed and heading differences $\Delta p$, $\Delta v$, $\Delta h$ should be exactly zero. Due to, e.g., inaccuracies in the respective motion sensors 4, 13 of the VRU's $U_1$ ITS-S $S_U$ and/or of the vehicle $C_1$ (or its ITS-S $S_C$), their different positions in the vehicle $C_1$, and/or different timing in determining the respective positions $p_U$, $p_C$ etc., there may be minor deviations. Nevertheless, the position difference $\Delta p$ in this example falls below a predetermined position threshold Tp. The same applies to the speed and the heading differences $\Delta v$, $\Delta h$, respectively, which fall below a predetermined speed threshold Tv and heading threshold Th, respectively, such that the first criterion is met and the controller 10 suppresses the transmitting of the VRU message $M_U$.

A different situation is shown for vehicle $C_2$ in FIG. 1, which is about to pass the cyclist VRU $U_2$. While, in this case, both the heading difference $\Delta h$ and the position difference $\Delta p$ fall below the respective thresholds Th, Tp, the speed difference $\Delta v$ between the VRU speed $v_U$ of the cyclist and the vehicle speed $v_U$ exceed the predetermined speed threshold Tv such that the first predetermined criterion is not met and the controller 10 does not suppress the transmitting of the VRU message $M_U$ of the transmitter 8 of the ITS-S $S_U$ of the VRU $U_2$.

A different second predetermined criterion shall now be explained based on the parking vehicle $C_3$ and the ITS-S $S_U$ of the VRU $U_3$ in FIG. 1. In this situation, the comparison performed by the controller 10 of the ITS-S $S_U$ of the VRU $U_3$ again comprises the determination of the position difference $\Delta p$ between its VRU position $p_U$ and the vehicle position $p_C$ of the parking vehicle $C_3$ and of a heading difference $\Delta h$ between the VRU heading $h_U$ and the vehicle heading $h_C$. In this case, the predetermined second criterion is met when the position difference $\Delta p$ falls below a predetermined position threshold Tp, the heading difference $\Delta h$ falls within a predetermined range a, and the vehicle speed $v_C$ is substantially zero. The range a is generally around 90 degrees and/or 270 degrees, e.g., from 30 degrees to 150 degrees and/or from 210 degrees to 330 degrees, or from 60 degrees to 120 degrees and/or from 240 degrees to 300 degrees; a different range a may alternatively be predetermined. As mentioned earlier, the motion sensor 13 of the vehicle $C_3$ (or its ITS-S $S_C$) may be slightly inaccurate in determining the speed $v_C$ and/or the position $p_C$ such that the determination may result in a very low (herein: "substantially zero") speed $v_C$ when the vehicle $C_3$ is actually parking. Hence, when the second predetermined criterion is met, it can be supposed that the VRU $U_3$ is boarding the parking vehicle $C_3$ as a passenger (or driver) and will, thus, continue driving aboard the vehicle $C_3$.

It shall be noted that the position, speed and heading thresholds Tp, Tv, Th optionally depend on circumstances such as speed $v_U$, $v_C$ or the like and/or on the predetermined criterion, as shown in FIG. 1 for the respective position thresholds Tp for the VRUs $U_1$ and $U_3$.

CONCLUSION

The disclosed subject matter is not restricted to the specific embodiments described in detail herein, but encompasses all those variants, modifications and combinations thereof that fall within the scope of the appended claims.

What is claimed is:

1. An Intelligent Transportation System station (ITS-S) for being carried by a Vulnerable Road User (VRU), comprising:
   a motion sensor configured to determine VRU motion data indicative of a VRU position, a VRU speed, and a VRU heading;
   a transmitter connected to the motion sensor and configured to transmit a VRU message including the determined VRU motion data;
   a receiver configured to receive, concerning a vehicle, vehicle motion data indicative of a vehicle position, a vehicle speed, and a vehicle heading; and
   a controller connected to the motion sensor and to the receiver and configured to control the transmitter, wherein the controller is configured to compare the determined VRU motion data with the received vehicle motion data and, when a result of the comparison meets a predetermined criterion, to suppress the transmitting of said VRU message; and
   wherein said comparison comprises a determination of a position difference between the VRU position and the vehicle position, of a speed difference between the VRU speed and the vehicle speed, and of a heading difference between the VRU heading and the vehicle heading, and wherein said predetermined criterion is met when each of the position, the speed, and the heading differences falls below a respective predetermined threshold.

2. An Intelligent Transportation System station (ITS-S) for being carried by a Vulnerable Road User (VRU), comprising:

a motion sensor configured to determine VRU motion data indicative of a VRU position, a VRU speed, and a VRU heading;

a transmitter connected to the motion sensor and configured to transmit a VRU message including the determined VRU motion data;

a receiver configured to receive, concerning a vehicle, vehicle motion data indicative of a vehicle position, a vehicle speed, and a vehicle heading; and a controller connected to the motion sensor and to the receiver and configured to control the transmitter, wherein the controller is configured to compare the determined VRU motion data with the received vehicle motion data and, when a result of the comparison meets a predetermined criterion, to suppress the transmitting of said VRU message; and wherein said comparison comprises a determination of a position difference between the VRU position and the vehicle position and of a heading difference between the VRU heading and the vehicle heading, and wherein said predetermined criterion is met when the position difference falls below a predetermined position threshold, the heading difference falls within a predetermined range, and the vehicle speed is substantially zero.

3. The ITS-S according to claim 2, wherein said predetermined range is one of from 30 degrees to 150 degrees and from 210 degrees to 330 degrees.

4. The ITS-S according to claim 1, wherein the motion sensor comprises a Global Navigation Satellite System based position sensor repetitively generating VRU position fixes and is configured to determine the VRU speed and VRU heading based on at least two of the generated VRU position fixes.

5. The ITS-S according to claim 1, wherein the received vehicle motion data comprises vehicle position fixes, and wherein the controller is configured to determine the vehicle speed and vehicle heading based on at least two of the received vehicle position fixes.

6. The ITS-S according to claim 1, wherein the VRU message is a Personal Safety Message, PSM.

7. The ITS-S according to claim 1, wherein the received vehicle motion data is included in one of a Basic Safety Message (BSM), a Cooperative Awareness Message (CAM), and a Collective Perception Message (CPM).

8. The ITS-S according to claim 2, wherein the motion sensor comprises a Global Navigation Satellite System based position sensor repetitively generating VRU position fixes and is configured to determine the VRU speed and VRU heading based on at least two of the generated VRU position fixes.

9. The ITS-S according to claim 2, wherein the received vehicle motion data comprises vehicle position fixes, and wherein the controller is configured to determine the vehicle speed and vehicle heading based on at least two of the received vehicle position fixes.

10. The ITS-S according to claim 2, wherein the VRU message is a Personal Safety Message, PSM.

11. The ITS-S according to claim 2, wherein the received vehicle motion data is included in one of a Basic Safety Message (BSM), a Cooperative Awareness Message (CAM), and a Collective Perception Message (CPM).

* * * * *